Jan. 15, 1929.  
C. SKLAREK  
1,699,508  
DIRIGIBLY MOUNTED LIGHT  
Original Filed Dec. 27, 1921    4 Sheets-Sheet 3
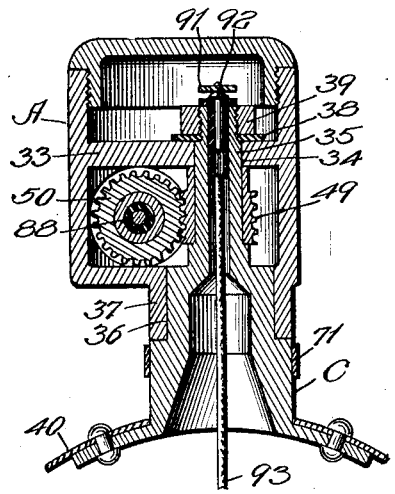
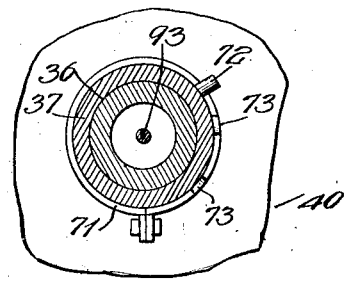
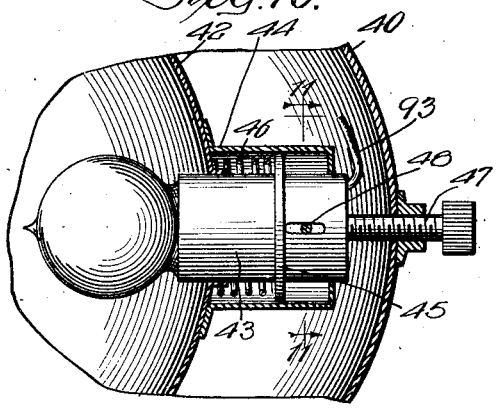
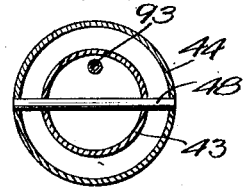
Witnesses:  
W. F. Kilroy  
Harry R. Lewhite  
Inventor:  
Clifford Sklarek  
By Geo. I. Haight  
His Attys.

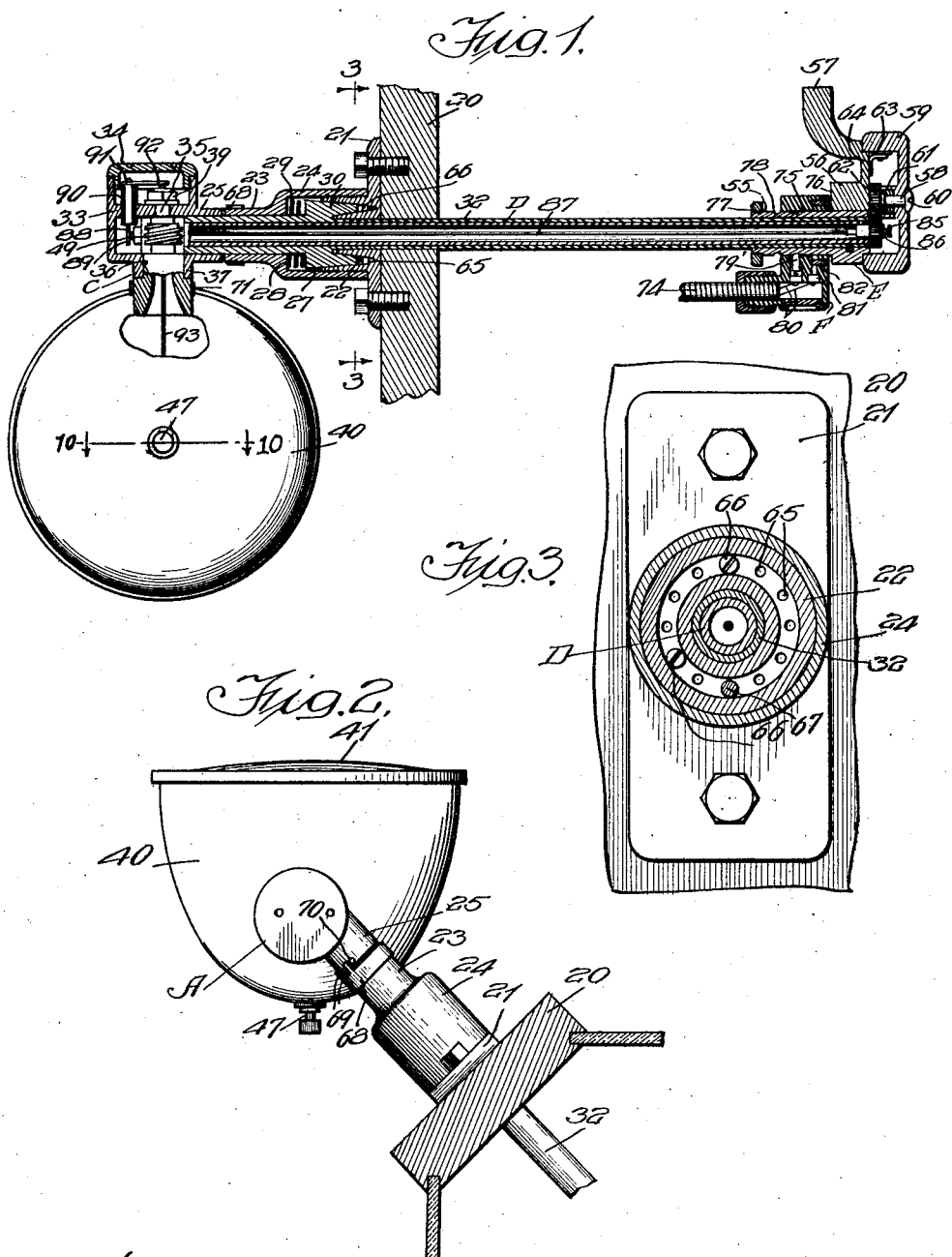

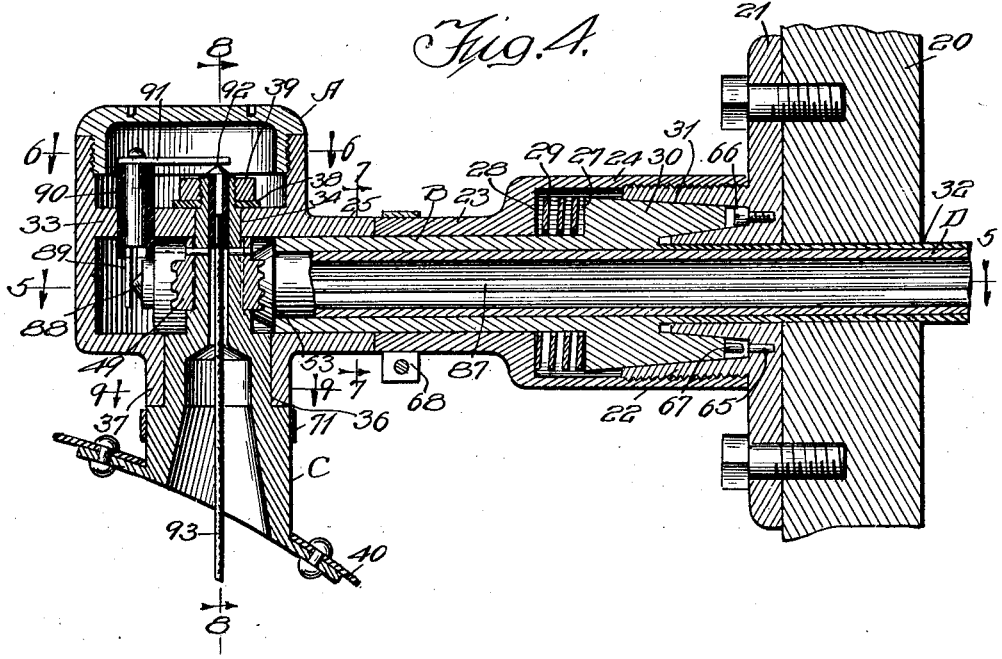
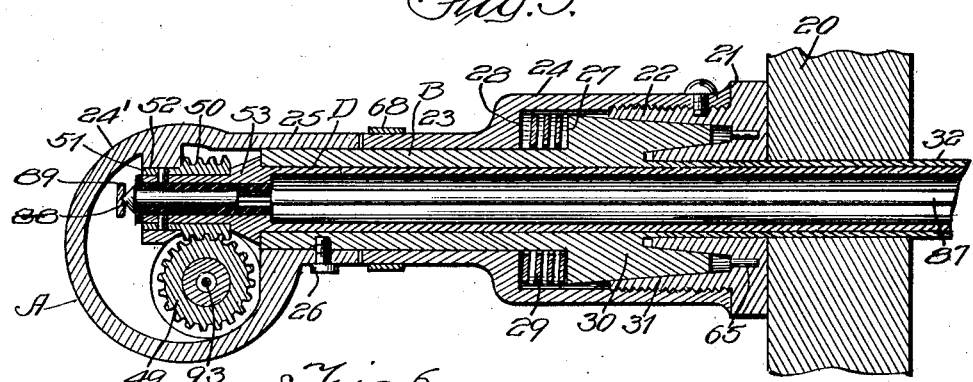
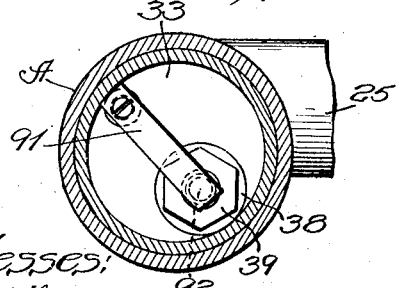
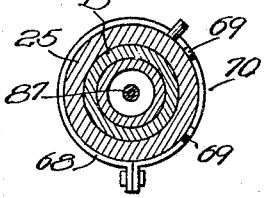

Jan. 15, 1929.
C. SKLAREK
1,699,508
DIRIGIBLY MOUNTED LIGHT
Original Filed Dec. 27, 1921  4 Sheets-Sheet 4
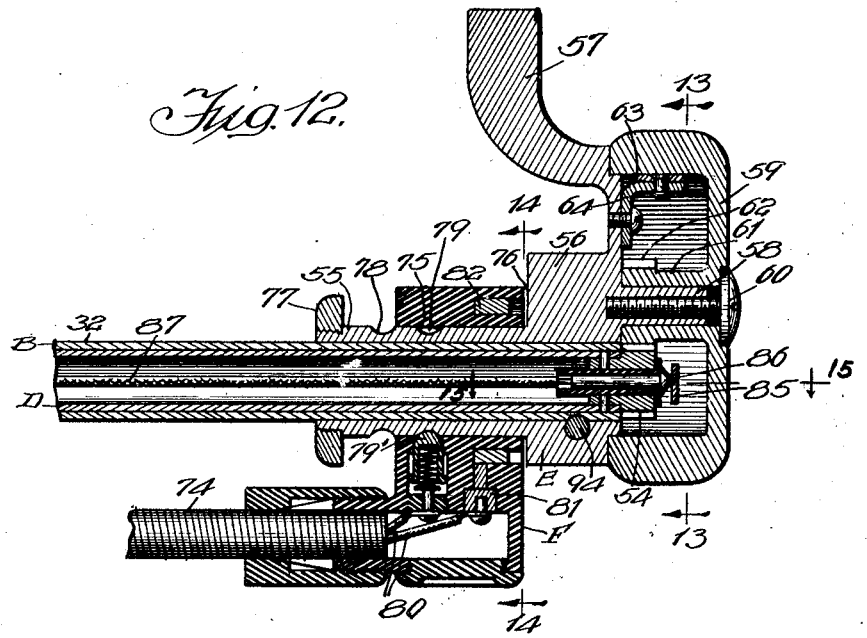
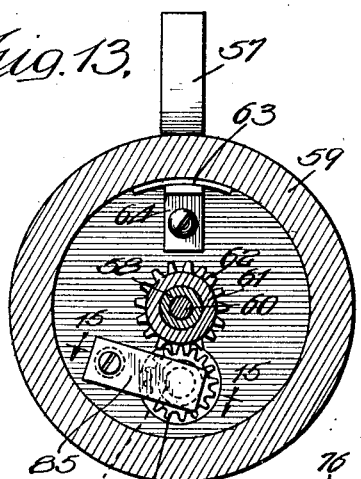
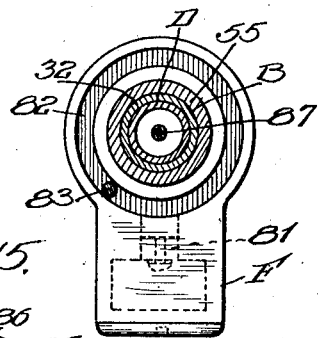
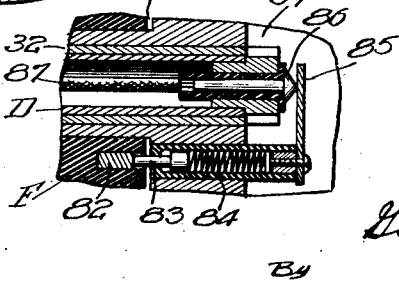
Witnesses:
W. F. Kilroy
Harry R. White
Inventor:
Clifford Sklarek
Geo. I. Wright
By His Attys.

Patented Jan. 15, 1929.

1,699,508

UNITED STATES PATENT OFFICE.

CLIFFORD SKLAREK, OF CHICAGO, ILLINOIS, ASSIGNOR TO INTERNATIONAL SPOTLIGHT CORPORATION, OF CHICAGO, ILLINOIS, A CORPORATION OF ILLINOIS.

DIRIGIBLY-MOUNTED LIGHT.

Application filed December 27, 1921, Serial No. 525,076. Renewed November 28, 1927.

This invention relates to improvements in dirigibly mounted lights.

One object of my invention is to provide a light, more particularly a spotlight for automobiles and other vehicles, which is universally adjustable by simple and easily operated means requiring the use of only one hand of the operator without change of position.

Another object of the invention is to provide an adjustably mounted light, and more especially a spotlight for automobiles or other vehicles wherein is employed an electric lamp proper to which the current is supplied by weather protected wiring, the electrical system including a control switch located immediately adjacent the light-adjusting means, the switch being so constructed that it may be thrown on or off by the same hand of the operator employed in manipulating the light and without shifting of the position of the hand.

Other objects of the invention are to provide an adjustably mounted spotlight having the parts thereof so designed that they may be economically manufactured and assembled and the parts applied to a vehicle with a minimum of effort and instruction.

In the drawings forming a part of this specification, Figure 1 is a vertical, sectional view taken through the corner post of a closed type of automobile superstructure and showing my improvements in connection therewith. Figure 2 is a horizontal, sectional view looking down upon the construction illustrated in Figure 1. Figure 3 is an enlarged detail sectional view corresponding substantially to the section line 3—3 of Figure 1. Figure 4 is a sectional view similar to Figure 1 but upon a larger scale and illustrating more clearly certain of the details of construction. Figure 5 is a horizontal, sectional view corresponding to the section line 5—5 of Figure 4. Figures 6, 7, 8 and 9 are detail sectional views corresponding to the section lines 6—6, 7—7, 8—8, and 9—9 of Figure 4, respectively. Figure 10 is a detail sectional view corresponding to the section line 10—10 of Figure 1 and illustrating more particularly means for adjusting the focus of the electric lamp proper with respect to its reflecting mirror. Figure 11 is a detail, sectional view corresponding to the section line 11—11 of Figure 10. Figure 12 is an enlarged detail sectional view corresponding to Figure 1 but illustrating more particularly the operating means and electric switch employed in my improvements. And Figures 13, 14 and 15 are detail sectional views corresponding to the section lines 13—13, 14—14 and 15—15 of Figure 12.

In said drawings, 20 indicates a corner post of the superstructure of a closed type of automobile or other part of the superstructure such as the windshield or the like and to which my improved spotlight is adapted to be attached. In the instance shown, the spotlight is primarily designed for use on closed types of cars and readily accessible for operation from the interior of the car at a point convenient to the driver and in proximity to the usual steering wheel.

In carrying out my invention, I employ a bracket 21 of suitable type which is secured to the corner post 20 by screws or other fastening devices. Said bracket 21 is provided with an outstanding hub 22 threaded on its exterior and with which cooperates a bearing sleeve 23 having a flange 24 threaded on its interior and cooperating with the threaded hub 22.

Rotatably mounted with respect to the support or bracket 21 on an axis extending approximately horizontally, is what may be termed generically a housing A. Said housing A, as shown, preferably consists of a casting having main vertically extending cylindrical section 24' from which is extended laterally a cylindrical sleeve 25, the latter being disposed axially with the sleeve 23. Telescoped within and rigidly secured to the sleeve 25 as by a set screw 26 or other suitable means, is a hollow operating arm designated generally by the reference character B.

Referring more particularly to Figures 4 and 5, it will be noted that said operating arm B is of cylindrical form within the bearing sleeve 23 and thereby adapted to rotate within the latter. Intermediate its outer end and where it passes through the post, said arm B is diametrically enlarged to provide an annular shoulder 27 opposite and spaced from the interior shoulder 28 provided on the bearing sleeve 23. Interposed between the two shoulders 27 and 28, for the purpose hereinafter described, is a coiled plate expansion spring 29. From the shoulder 27, said arm B is formed with a tapered annular flange 30 which fits within the corresponding annular tapered groove 31 formed in the hub of the bracket 21. With this arrangement, it will be noted that the spring 29 constantly tends to force the operating arm B carrying the housing A toward the right and thereby frictionally hold the operating arm against accidental rotation by reason of the cooperating tapered flange and groove above referred to.

The operating arm B is also provided with an extension of hollow tubular form 32 passing through a corresponding bearing opening in the bracket 21 and a suitable opening in the post 20 to the interior of the car and to the inner end of which is applied the manually operable means and electric switch, as hereinafter described. From the preceding description, it will be seen that the housing A is rotatable about a substantially horizontal axis when the operating arm B is rotated, as hereinafter explained.

The housing A is provided on the interior thereof with a horizontally extending partition 33 having a bearing 34 therein eccentrically disposed with respect to the axis of the housing, said bearing 34 receiving a journal 35 integral or otherwise rigid with respect to an upward extension from a lamp-holding member C, the latter being rotatable about an axis transverse to but offset from the axis of rotation of the housing A, as will be clear from an inspection of Figure 5. Said holder C is provided also with another lower journal 36 rotatable in a journal bearing flange 37 on the bottom of the housing A. The holder C is held assembled with the housing A by suitable means such as the washer 38 and nut 39 applied to the top end of the extension from the holder C above the partition 33.

The holder C has a shell 40 of suitable construction secured thereto, the shell 40 carrying the usual lens 41 and reflecting mirror 42 together with the electric lamp proper indicated at 43 in Figure 10.

By referring to Figure 10, it will be noted that the electric lamp proper is adjustable with respect to the reflector 42 so as to obtain the proper focusing of the light, this being accomplished by employing a casing 44 within which the base of the lamp proper is slidably mounted. The base of the lamp proper has a flange 45 thereon, between which flange and a suitable portion of the mirror is interposed a spring 46. An adjustable set screw 47 is threaded through the shell 40 so that the lamp proper may be adjusted inwardly and outwardly for the purpose described. To prevent the lamp and its base from turning within the casing 44, suitable means such as the pin and slot arrangement shown at 48 may be employed.

To effect independent rotation of the lamp holder C about its axis, the same has secured thereto within the housing A and between the partition 33 and bottom wall of the housing, a helical gear 49 which cooperates with another helical gear 50 rigidly affixed to an operating shaft D, as shown best in Figures 5 and 8. The shaft D at its inner end within the housing A, has a bearing sleeve 51 secured thereto and is rotatable in a journal bearing formed in a flange 52 made integral with the housing A.

The shaft D is enlarged as indicated at 53 so as to provide a shoulder bearing against the corresponding shoulder formed at the inner end of the operating arm B. From the shoulder section 53, the shaft D is extended through the operating arm B to the righthand end thereof as viewed in Figures 1 and 12 and at its end has rigidly secured thereto a pinion 54 as shown in Figures 1 and 12. It will be noted that rotation of the shaft D will produce rotation of the holder C about its particular axis and hence the universal adjustment of the light is thus provided for.

For operating the arm B and shaft D with the utmost convenience, I provide the following arrangement, particular reference being had to Figure 12. Applied to the outer side of the operating arm B at its inner end, is a preferably cast block E. The latter is formed with a sleeve portion 55 and with what may be termed a base 56 from which is extended radially a suitable lever handle 57.

Rotatably mounted on the block E on an integral stud 58 extending from the base 56 parallel to but offset from the axis of the rotatable arm B, is a hand wheel 59. The latter is held in position by any suitable means such as the screw 60 threaded into the stud 58. The hand wheel 59 is formed with an interior preferably integral hub 61, the inner end of which is in the form of a gear 62 which meshes with the gear or pinion 54, heretofore described.

With the arrangement shown, it is evident that the operator may apply either of his hands over the wheel 59 and with two of his fingers straddling the lever handle 57. By holding the hand wheel and handle 57 together as a unitary structure, rotation of the operating arm B may be made to thereby effect the rotation of the housing A about its axis. Without shifting the position of his hands, the operator may also give an independent turning movement to the hand wheel 59, thus imparting rotation to the operating shaft B, which thus produces rotation of the lamp-holder C about its axis on the housing A. As will be evident to those skilled in the art, this affords an exceedingly simple method of effecting the universal adjustment of the light, the adjustment in a vertical plane and horizontal plane of the two parts being readily made either independently or simultaneously, dependent upon the manner in which the operator actuates the hand wheel and hand lever.

A friction brake 63 may be employed to prevent accidental rotation of the hand wheel 59, said brake 63 being on the interior of the hand wheel and carried by a right-angled piece of spring material 64 secured to the lever handle 57.

In certain cities, ordinances are in effect which restrict the zone of operations of a spotlight. To prevent my improved spotlight having its rays directed within prohibited zones, I may employ the several following means or any combination thereof, dependent upon the conditions encountered. Referring to Figures 3 and 4, it will be noted that the bracket 21, at the bottom end of the groove 31, is formed with a circular series of spaced threaded holes 65, in any pair of which may be inserted screws 66 to thereby restrict the rotative movement of the operating arm and housing, there being a cooperating projection from the inner end of the flange 31. By varying the position of the screws 66, it is evident that the zone of operation of the light may be restricted with respect to rotation about the horizontal axis. Referring to Figures 4 and 7, it will be seen that a similar result may be obtained by applying a friction clamp band 68 around the bearing sleeve 23, said band 68 having integrally formed suitably spaced lugs 69—69 extending therefrom toward and over the adjacent portion of the housing A, the latter having a corresponding radially extended lug 70, as shown in Figure 2. Preferably the surface of the bearing sleeve 23 will be knurled or roughened beneath the band 68 so as to prevent the latter from slipping after it has once been properly set.

An arrangement similar to that last described may be employed between the lamp-holder C and the housing A, as best shown in Figures 4 and 9, where the band 71 is applied to the holder C and the radial lug 72 is on the housing A, said lug 72 engaging at the end of its movement with lugs 73—73 formed integrally with the band 71.

As is well known by those skilled in the art, it is highly desirable that the electric wiring through the lamp proper be thoroughly protected against the weather and also that there shall be no danger of any of the wires or cable becoming twisted or unduly stressed as a result of the frequent manipulation of the spotlight. It is also essential that the electric circuit have a control switch therein which may be operated with ease. To accomplish the results indicated, I have provided the following arrangement.

In making the electric circuit, I preferably employ the so-called grounded system, the source of electrical energy being derived from the usual battery found on automobiles. From the battery are led two insulated wires up to the spotlight as by means of an armored flexible cable 74, the terminal of which is secured within a lead-in block F of insulated material, as best shown in Figure 12. The lead-in block F is provided with a bearing 75 by which it is loosely rotatably suspended on the sleeve 55 of the operating block E. The lead-in block F is slidable back and forth on said sleeve 55 between the shoulder 76 formed by the post 56 and a nut 77 threaded on the inner end of the sleeve 55.

The sleeve 55 is provided with two annular grooves 78 and 79 longitudinally separated and with which is adapted to cooperate a metallic spring-pressed plunger 79 mounted in the block F and connected to the ground wire 80 from the battery. In this manner the lead-in block may be held in either of its adjusted positions and the ground side of the circuit effectively made.

The other or positive conductor 80 from the battery is connected to an insulated terminal 81 in the block F, said terminal 81 in turn being electrically connected with an annular contact ring 82 seated in the block F and with which is adapted to cooperate a spring-controlled contact pin 83 mounted in an insulated bushing 84 carried by the block E, as best shown in Figure 15. With this arrangement, it is evident that contact will always be maintained during rotation of the operating elements so long as the lead-in block F is in the position shown in Figures 12 and 15. The circuit is easily broken by pushing the lead-in block back along the sleeve 55 until the plunger 79 engages in the groove 78. In this connection, it will be noted that the operator may throw on or off the switch while his hand is in position to effect the adjustment of the spotlight.

The contact pin 83 is electrically connected with a spring plate 85 which bears upon a headed contact pin 86 mounted in a suitable insulating bushing rigidly carried by the inner end of the hollow shaft D. From the pin 86 extends an electrically connected wire 87 through the shaft D to another insulated contact pin 88 at the inner end of the shaft D, as best shown in Figure 5. Engageable with the contact pin 88 is a resilient plate 89 carried by an insulating bushing 90 rigidly mounted in the partition 33 of the housing A, as shown in Figure 4. The plate 89 is in turn electrically connected with another spring plate 91 which has bearing contact with a contact pin 92 mounted in an insulating bushing carried by the upper end of the lamp-holder C. From the pin 92 is extended an electrically connected wire 93 leading to the base of the lamp proper 43.

From the preceding description, it will be seen that the electrical circuit may be kept closed in any position of the spotlight and that the circuit may be closed or opened simply by shifting the position of the lead-in block F.

By referring to the drawings, it will be noted that the entire lamp may be assembled at the factory in the condition shown and applied with the exception of the block E and lead-in block F. In applying the device to a car, it is merely necessary to bore a hole through the post of the proper diameter to receive the operating arm B and then pass the latter therethrough and secure the bracket 21 in place. After this is done, the proper electrical connections are made within the lead-in block F with the wires from the cable, the lead-in block F then slipped over the sleeve 55 of the operating block E, the nut 77 then put in place, and finally the assembled lead-in block F and operating block E applied to the operating arm B and rigidly secured thereto as by the screw 94. The proper electrical connections and operating connections may thus be made without any necessity of adjustment of the parts and with a minimum amount of time and effort employed by the user in applying to the car.

I have herein shown and described what I now consider the preferred manner of carrying out the invention but the same is merely illustrative and I contemplate all changes and modifications that come within the scope of the claims appended hereto.

I claim:

1. In a dirigible light, the combination with a support; of a lamp supporting member rotatable on said support about one axis; a second lamp supporting member rotatably supported on said first member about a transversely disposed axis; an operating extension from said first member rotatable about said first axis; and means for imparting independent rotation to said second member about its axis including a manually operable power transmitting element rotatable on said operating extension about an axis parallel to but offset from said first axis; said operating extension and element being adapted for simultaneous movement.

2. In a dirigible light, the combination with a support; of a lamp supporting member rotatable on said support about one axis; a second lamp supporting member rotatably supported on said first member about a transversely disposed axis; means for imparting rotation independently to each of said members about their respective axes including, concentrically disposed elements and manually operable devices at the ends of said elements, one of said devices having actuating means offset from the axis of rotation of said power transmitting elements upon which the other actuating device is mounted.

3. In a dirigible light, the combination with a support; of a lamp supporting member rotatable on said support about one axis; a second lamp supporting member rotatably supported on said first member about a transversely disposed axis; an operating arm extending from the first lamp supporting member and rigid therewith; a shaft independently movable within said operating arm and operatively connected with said second lamp supporting member; and means operatively connected with said shaft, said means being movably mounted on said operating arm at a point removed from the axes of rotation of said shaft and said first lamp supporting member to effect adjustment of said second lamp supporting member about its axis.

4. In a dirigible light, the combination with a support; of a lamp supporting member rotatable on said support about one axis; a second lamp supporting member rotatably supported on said first member about a transversely disposed axis; an operating arm extending from said first member rigid and rotatable therewith; an operating shaft rotatable within said operating arm and operatively connected at one end to said second member; and a hand wheel geared to said shaft at its other end to effect rotation thereof, said hand wheel being rotatably mounted on said arm about an axis offset from said axis of rotation of said shaft.

5. In a dirigible light, the combination with a support; of a lamp supporting member rotatably mounted on said support to turn about one axis; a second lamp supporting member mounted on said first member to rotate about an axis transverse to the first axis; a hollow operating arm extending from said first member and rotatable about said first axis; an operating shaft rotatably mounted within said operating arm, said shaft at one end being operatively connected with said second member; a handle rigid with the free end of said operating arm to effect its rotation; and a hand wheel rotatably mounted on said handle and operatively geared to the adjacent end of said shaft.

6. In a dirigible light, the combination with a support adapted to be secured to a fixed member, said support having an annular friction groove therein, said groove having opposed side walls; of a housing rotatably mounted with respect to said support and having a cooperable friction flange working within said groove and frictionally engaging both side walls thereof; spring means normally maintaining said flange in frictional engagement with said groove; and means for rotating said housing.

7. In a dirigible light, the combination with a bracket adapted to be secured to a fixed support, said bracket having a journal bearing therein and an annular tapered groove; of a housing having an operating arm rotatably mounted in said bearing and provided also with an annular tapered flange cooperable with said groove; a sleeve detachably secured to said bracket and providing a second bearing for the arm of said housing, said sleeve and arm having opposed annular shoulders; and a spring interposed between said shoulders normally tending to force said flange within said groove.

8. In a dirigible light, the combination with an adjustably mounted electric lamp-holder and means for adjusting said holder including a rotatable arm; of means for completing an electric circuit with said lamp from an outside source of current including, a lead-in block loosely rotatably mounted on said arm and provided with a contact ring, a contact pin carried by said arm and engageable with said ring during rotation of said arm, said block being axially movable along said arm to thereby make and break the circuit between said contact ring and pin.

9. In a dirigible light, the combination with an adjustably mounted electric lamp-holder and means for adjusting said holder including a rotatable arm; of means for completing an electric circuit with said lamp from an outside source of current including, a lead-in block loosely rotatably mounted on said arm and provided with a contact ring, a contact pin carried by said arm and engageable with said ring during rotation of said arm, said block being axially movable along said arm to thereby make and break the circuit between said contact ring and pin; shoulders on said arm limiting the movements of said block lengthwise thereof; and yieldable means to hold said block in either of its adjusted positions lengthwise of said arm.

10. In a dirigible light, the combination with an adjustably mounted electric lamp-holder and means for adjusting said holder including a rotatable arm; of means for completing an electric circuit with said lamp from an outside source of current including, a lead-in block rotatably supported on said arm, said block having a contact element carried thereby, a cooperable contact element carried by said arm, said block being shiftable lengthwise of the arm to thereby make and break the circuit between said contact elements.

11. In a dirigible light, the combination with an adjustably mounted electric lamp-holder and means for adjusting said holder including a rotatable arm and a handle rotatably mounted on said arm; of means for completing an electric circuit with said lamp from an outside source of current including, a lead-in block rotatably supported on said arm, said block having a contact element carried thereby, a cooperable contact element carried by said arm, a contact pin disposed axially of said arm and terminating within said handle, and electrical connections between said contact pin and said contact element carried by said arm.

12. In a dirigible light, the combination with a support; of a lamp supporting member rotatable on said support about one axis; a second lamp supporting member rotatably supported on said first member about a transversely disposed axis; an operating arm extending from said first member rigid and rotatable therewith; an operating shaft rotatably mounted within said operating arm, said shaft at one end being operatively connected with said second member; a handle rigid with the free end of said operating arm to effect its rotation; a hand wheel rotatably mounted on said handle and operatively geared to the adjacent end of said shaft; and a friction brake cooperable with said hand wheel to prevent accidental rotation thereof.

13. In a dirigible light, the combination with a lamp head proper; of an arm extending therefrom; a shaft rotatably mounted on a support, said arm being rotatably mounted on said shaft on an axis at an angle to the axis of rotation of said shaft; an operating handle rigid with said arm; an operating hand wheel eccentrically mounted for rotation on said operating handle; and driving connections between said arm and hand wheel.

14. In a dirigible light, the combination with a lamp head proper; of means for producing independent rotation of said head about two axes at an angle to each other, said means including a swinging operating handle lever and a hand wheel journaled on said lever for rotation about an axis disposed eccentrically to the axis about which the lever is adapted to swing.

15. In a dirigible light, the combination with a lamp proper; of means for supporting and operating said lamp, including rotatable actuating mechanism for imparting movement to said lamp proper; means for completing an electric circuit with said lamp proper from an outside source of current including, a lead-in block mechanism associated with said supporting and operating means, one of said mechanisms being provided with a contact ring, and a contact pin carried by the other mechanism, said pin being engageable with said ring during relative rotation between the parts, said block mechanism being movable along said supporting and operating means to thereby make and break the circuit between said contact ring and pin.

16. In a dirigible light, the combination with a bracket adapted to be secured to a fixed support, said bracket having an annular groove therein provided with a plurality of spaced openings; of a lamp supporting member having a cooperable flange disposed within said groove; a plurality of pins adapted to be selectively engaged with the openings in said groove; a pin on said flange adapted to coact with the pins in said openings to limit rotative movement of said flange with reference to said bracket; and means for maintaining said flange in said groove.

17. In a dirigible light, the combination with a supporting member; of a lamp supporting member rotatably mounted on said support; and means for limiting the rotative movement of said supporting member with reference to said shaft, including a plurality of spaced openings in one of said members and a plurality of stop pins adapted to be selectively engaged with said openings, and a pin in the other of said members movable in the path of said first pins and adapted to come into contact therewith.

18. In an adjustable light, the combination with a support; of a carrier having a rigid hollow sleeve and rotatable on said support about the axis of said sleeve; a second carrier mounted on said first carrier to rotate about an axis different from said first axis; a shaft rotatably mounted in said hollow sleeve, said shaft having one of its ends operatively connected to said second carrier; and means for imparting rotation to said sleeve and to said shaft including an arm rigid with said sleeve and extending laterally therefrom; a manually controlled operating element rotatably mounted about its individual axis on said arm, and operative connections between said element and the adjacent end of said shaft for effecting rotation of the latter when said element is rotated about its individual axis.

19. In a dirigible light, the combination with relatively fixed supporting means; of a hollow arm rotatably mounted on said supporting means to turn about one axis, said hollow arm projecting beyond said supporting means at either side thereof, and one end of said arm having a hollow head associated therewith; a lamp carrying member rotatably supported from said head to turn about an axis at an angle to said first axis; an electric circuit; an operating shaft extending through said hollow arm and having a worm gear adapted to engage with a worm gear on said lamp carrying member to effect rotation of the latter upon its axis, said actuating shaft having a conductor extending therethrough, and said light carrying member being provided with conducting means; and contact means connecting said conductor of the operating shaft and said lamp carrying member for completing the circuit through said operating shaft and said lamp carrying member.

In witness that I claim the foregoing I have hereunto subscribed my name this 8th day of December, 1921.

CLIFFORD SKLAREK.